(12) United States Patent
Sura et al.

(10) Patent No.: US 10,824,481 B2
(45) Date of Patent: Nov. 3, 2020

(54) PARTIAL SYNCHRONIZATION BETWEEN COMPUTE TASKS BASED ON THRESHOLD SPECIFICATION IN A COMPUTING SYSTEM

(71) Applicant: INTERNATIONAL BUSINESS MACHINES CORPORATION, Armonk, NY (US)

(72) Inventors: Zehra Sura, Yorktown Heights, NY (US); Li Zhang, Yorktown Heights, NY (US); Ashish Kundu, Elmsford, NY (US); Ravi Nair, Briarcliff Manor, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/188,549

(22) Filed: Nov. 13, 2018

(65) Prior Publication Data
US 2020/0151028 A1    May 14, 2020

(51) Int. Cl.
*G06F 9/46* (2006.01)
*G06F 9/52* (2006.01)
*G06N 20/20* (2019.01)
*G06N 3/08* (2006.01)

(52) U.S. Cl.
CPC ............ *G06F 9/522* (2013.01); *G06N 20/20* (2019.01); *G06N 3/08* (2013.01)

(58) Field of Classification Search
CPC .... G06F 9/522; G06F 9/3009; G06F 9/30087; G06F 9/3851; G06F 9/4881; G06F 9/458; G06F 9/524; G06F 9/526; G06F 9/528; G06F 2009/521; G06F 2009/522; G06F 2009/523; G06F 2009/52
See application file for complete search history.

(56) References Cited

U.S. PATENT DOCUMENTS

| | | | |
|---|---|---|---|
| 9,164,843 B1 * | 10/2015 | Havemose | G06F 11/1471 |
| 9,218,222 B2 * | 12/2015 | Solinas | G06F 9/522 |
| 9,495,223 B2 | 11/2016 | Ebcioglu et al. | |
| 9,836,402 B1 * | 12/2017 | Riel | G06F 12/0868 |
| 9,948,505 B2 | 4/2018 | Tiwari et al. | |

(Continued)

FOREIGN PATENT DOCUMENTS

EP    2937783 A1 *    10/2015    ............. G06F 9/522

OTHER PUBLICATIONS

Wilson et al. A synchronisation method, Oct. 28, 2015, European Patent Applicant (Year: 2015).*

(Continued)

*Primary Examiner* — Emerson C Puente
*Assistant Examiner* — Zhi Chen
(74) *Attorney, Agent, or Firm* — Griffiths & Seaton PLLC (57) ABSTRACT

Embodiments for implementing partial synchronization between compute processes based on threshold specification in a computing environment. One or more compute processes may be synchronized in one of a plurality of types of computing platforms using a barrier having a barrier release condition based on a threshold of one or more measures. The barrier is defined according to one or more parameters. The one or more compute processes may be released via the barrier upon exceeding the threshold of the one or more measures.

17 Claims, 9 Drawing Sheets

(56) References Cited

U.S. PATENT DOCUMENTS

| | | | | |
|---|---|---|---|---|
| 10,152,676 | B1* | 12/2018 | Strom | G06N 3/08 |
| 2010/0306280 | A1* | 12/2010 | Sapek | G06F 16/289 |
| | | | | 707/803 |
| 2011/0131425 | A1* | 6/2011 | Banerjee | G06F 1/3209 |
| | | | | 713/300 |
| 2012/0110237 | A1* | 5/2012 | Li | G06F 9/45558 |
| | | | | 711/6 |
| 2013/0111152 | A1* | 5/2013 | Couvee | G06F 9/461 |
| | | | | 711/147 |
| 2013/0117750 | A1* | 5/2013 | Howes | G06F 9/522 |
| | | | | 718/102 |
| 2014/0163785 | A1* | 6/2014 | Kawada | B61C 17/12 |
| | | | | 701/20 |
| 2014/0181554 | A1* | 6/2014 | Manne | G06F 1/3234 |
| | | | | 713/323 |
| 2015/0150010 | A1* | 5/2015 | Odaira | G06F 9/466 |
| | | | | 718/101 |
| 2015/0309845 | A1* | 10/2015 | Wilson | G06F 9/522 |
| | | | | 718/106 |
| 2016/0239302 | A1* | 8/2016 | Puthoor | G06F 9/3851 |
| 2017/0075959 | A1* | 3/2017 | Branson | G06F 16/2456 |
| 2017/0097779 | A1* | 4/2017 | Steinmacher-Burow | ........ |
| | | | | G06F 9/30 |
| 2017/0300830 | A1* | 10/2017 | Kadav | G06F 15/17312 |
| 2018/0157690 | A1* | 6/2018 | Kabiljo | H04L 67/1097 |
| 2018/0260256 | A1* | 9/2018 | Kadav | G06F 9/52 |
| 2018/0349138 | A1* | 12/2018 | Guthrie | G06F 9/3834 |
| 2018/0357047 | A1* | 12/2018 | Brown | G06N 3/082 |
| 2019/0018740 | A1* | 1/2019 | Thomsen | G06F 11/1469 |
| 2019/0118099 | A1* | 4/2019 | Payzer | A63F 13/86 |
| 2020/0110676 | A1* | 4/2020 | Volos | G06F 9/4881 |

OTHER PUBLICATIONS

"Method and Apparatus for Workload-Aware Synchronization Mechanism in Multi-threaded Java Applications" An IP.com Prior Art Database Technical Disclosure, Authors et. al.: Disclosed Anonymously. IP.com No. IPCOM000227693D May 13, 2013 (4 Pages).

"Service-Level-Agreement-Aware Thread-Pool and Request Handling for Application Servers" An IP.com Prior Art Database Technical Disclosure Authors et. al.: Disclosed Anonymously. IP.com No. IPCOM000252550D Jan. 23, 2018 (8 Pages).

"A method to synchronize verification environment, logic interface and specification (Spec Coherenchy tool)" An IP.com Prior Art Database Technical Disclosure Authors et. al.: Disclosed Anonymously IP.com No. IPCOM000247192D Aug. 15, 2016 (10 Pages).

"Technique for efficient feedback driven synchronization between multiple threads on shared data in Java" An IP.com Prior Art Database Technical Disclosure Authors et. al.: Disclosed Anonymously. IP.com No. IPCOM000239298D, Oct. 28, 2014 (10 Pages).

"Computer Architecure: Multithreading" Prof. Onur Mutlu (Editted by Seth) Carnegie Mellon University (25 Pages).

"Performance Measurements for Multithreaded Programs" Minwen Ji, Edward W, Felten and Kai Li Department of Computer Science, Princeton University Princeton, NJ 08544 USA (10 Pages).

* cited by examiner

PARTIAL SYNCHRONIZATION BETWEEN COMPUTE TASKS BASED ON THRESHOLD SPECIFICATION IN A COMPUTING SYSTEM

BACKGROUND OF THE INVENTION

Field of the Invention

The present invention relates in general to computing systems, and more particularly to various embodiments for partial synchronization between compute tasks based on threshold specification in a computing environment.

Description of the Related Art

Over recent decades, computers and computer-driven equipment have become commonplace. Processing devices, with the advent and miniaturization of integrated circuits, have become integrated into a wide variety of personal, business, health, home, education, scientific, and other devices. With the increased usage of computing networks, such as the Internet, humans are currently inundated and overwhelmed with the amount of information available to them from various structured and unstructured sources. As great strides and advances in technologies come to fruition, the greater the need to make progress in these systems advantageous for efficiency and improvement.

SUMMARY OF THE INVENTION

Various embodiments for implementing synchronization between compute tasks based on threshold specification in a computing environment, by a processor, are provided. In one embodiment, by way of example only, a method for implementing partial synchronization between compute processes based on threshold specification in a distributed or parallel computing environment, again by a processor, is provided. One or more compute processes may be synchronized in one of a plurality of types of computing platforms using a barrier having a barrier release condition based on a threshold of one or more measures. The barrier is defined according to one or more parameters. The one or more compute processes may be released via the barrier upon exceeding the threshold of the one or more measures.

BRIEF DESCRIPTION OF THE DRAWINGS

In order that the advantages of the invention will be readily understood, a more particular description of the invention briefly described above will be rendered by reference to specific embodiments that are illustrated in the appended drawings. These drawings depict only typical embodiments of the invention and are not therefore to be considered to be limiting of its scope. The invention will be described and explained with additional specificity and detail through the use of the accompanying drawings, in which.

DETAILED DESCRIPTION OF THE INVENTION AND DRAWING

In parallel or distributed computing system, multiple computing processes (or "threads") work asynchronously to execute tasks in an application. Except in embarrassingly parallel applications, multiple computing processes need to co-ordinate with one another. A barrier is a synchronization mechanism used when multiple processes need to interlock with one another. Barriers require each computing process to wait until all computing processes have reached the barrier point in the application, and then the barrier releases and all processes continue execution. A barrier may be configured to apply to only a specified subset of compute processes instead of all processes in the application.

Currently, however, synchronization mechanisms (e.g., semaphores, counting semaphores, mutexes, atomic operations, event traps, and transactions) are not expressive to capture algorithmic-level semantics in some application scenarios such as, for example, when "any x" number of processes from a set of "y" processes need to interlock, or when the barrier release should occur when a certain amount of data is updated in a specified memory region. In such cases, using existing synchronization constructs (e.g., locks with custom code) to encode the application semantics results in unnecessary synchronizations or an inefficient implementation, which renders some class of solutions to be impractical on current compute platforms.

Hence, because current synchronization mechanisms are unable to directly express synchronization semantics based on thresholds of defined measure (e.g., computation performed, or data processed), efficient implementations are prevented that are practical and that can support end-application semantics.

Accordingly, the present invention provides for a barrier-like synchronization mechanism and operation, where a barrier release condition is based on reaching a threshold on one or more defined measures. For example, a measure may be a number of processes and/or an amount of data updated in a specified memory region. The threshold may be specified as an absolute value (e.g., x of y processes) and/or as a fraction (e.g., x percent of elements of array A). Such synchronization can then be efficiently implemented in system software and/or with hardware support.

In an additional aspect, the present invention provides for implementing partial synchronization between compute processes based on threshold specification in a distributed or parallel computing environment. One or more compute processes may be synchronized in one of a plurality of types of computing platforms using a barrier (e.g., a synchronization barrier) having a barrier release condition based on a threshold of one or more measures. The barrier is defined according to one or more parameters. The one or more compute processes may be released via the barrier upon exceeding the threshold of the one or more measures. In this way, the present invention enables synchronization to directly express semantics of an algorithm/application in an application code implementing the synchronization barrier having a barrier release condition, which enables efficient system-level implementations that are practical and may support a new class of application solutions. It should be noted that without the barrier-like synchronization mechanism and operation of the present invention, such semantics are required to be explicitly encoded and emulated using available mechanisms, which can artificially constrain the behavior and semantics of the application and/or cause the application to decrease in computing efficiency.

It is understood in advance that although this disclosure includes a detailed discussion of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
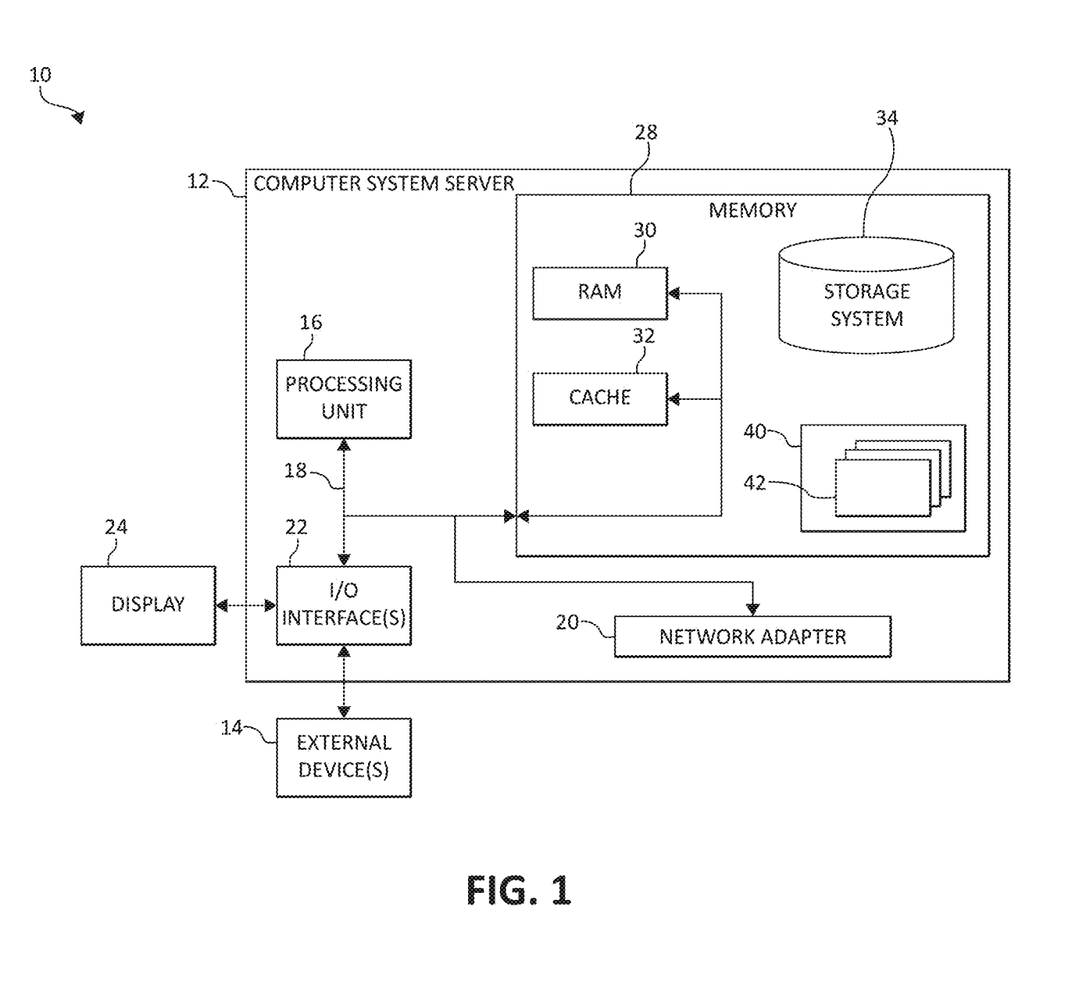
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk" or Universal Serial Bus (USB) "thumb drive"), and an optical disk drive for reading from or writing to a removable, non-volatile optical disk such as a CD-ROM, DVD-ROM or other optical media can be provided. In such instances, each can be connected to bus 18 by one or more data media interfaces.

As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
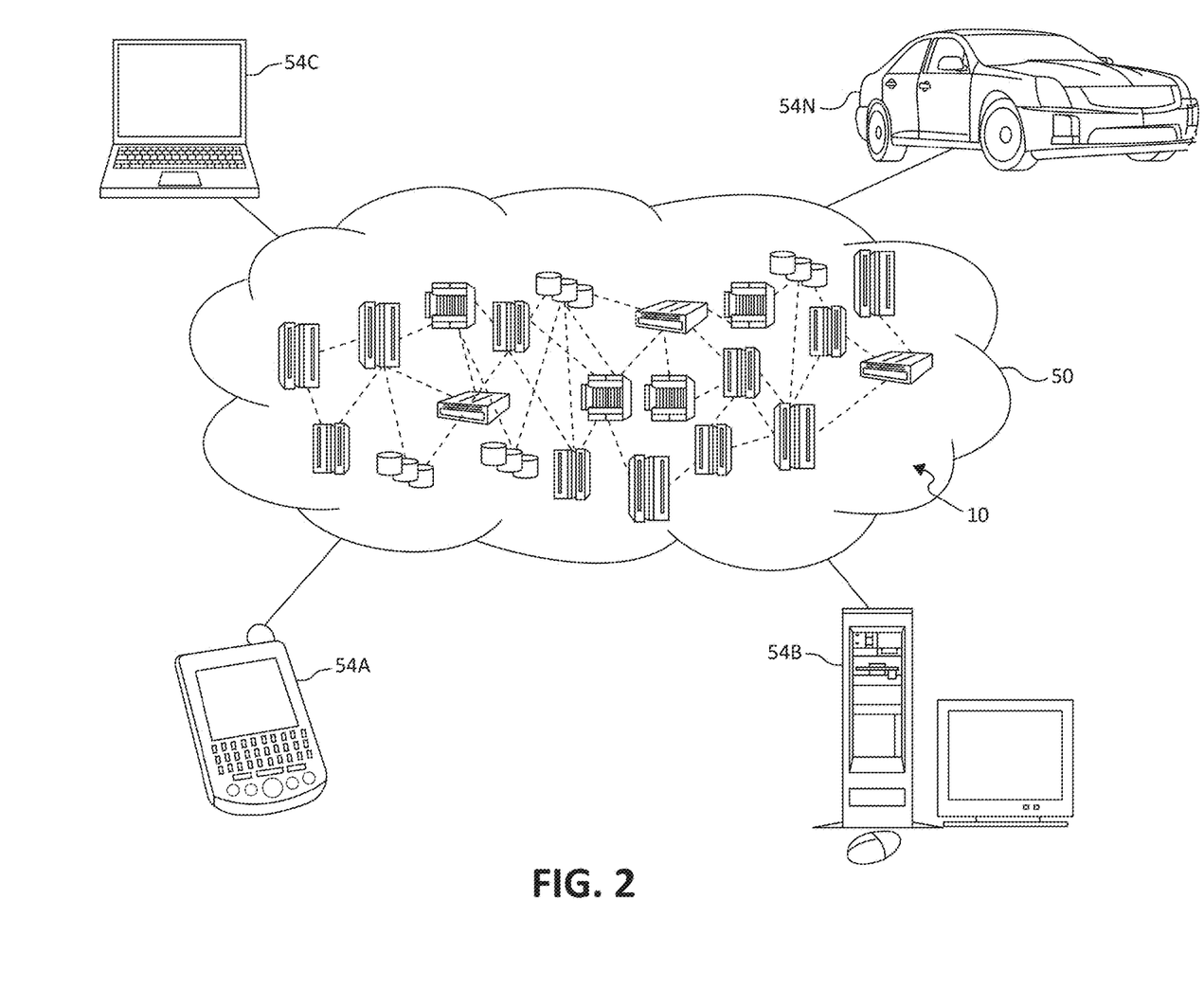
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
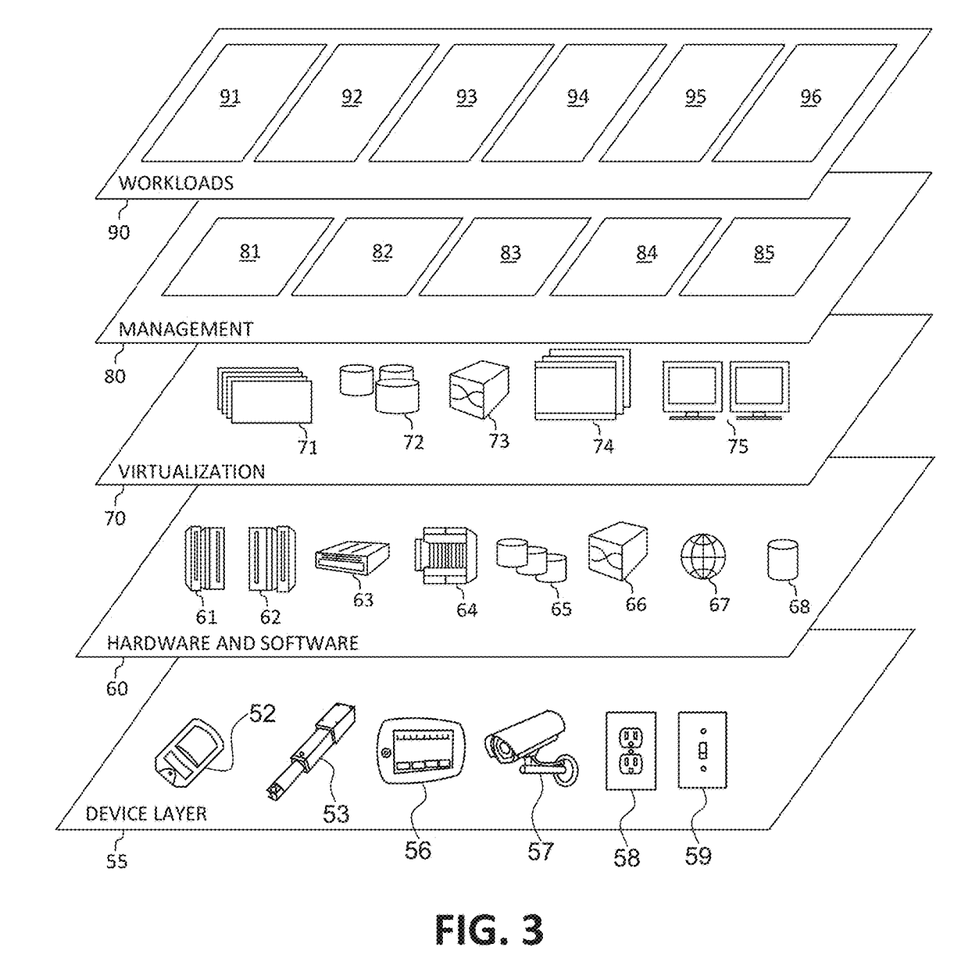
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74;
and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various runtime analysis tool workloads and functions 96. In addition, runtime analysis tool workloads and functions 96 may include such operations automated data exploration and validation, and as will be further described, user and device management functions. One of ordinary skill in the art will appreciate that the runtime analysis tool workloads and functions 96 may also work in conjunction with other portions of the various abstraction layers, such as those in hardware and software 60, virtualization 70, management 80, and other workloads 90 (such as data analytics processing 94, for example) to accomplish the various purposes of the illustrated embodiments of the present invention.

As previously mentioned, the present invention provides for implementing partial synchronization between compute processes based on threshold specification in a distributed or parallel computing environment. A synchronization barrier may be used and includes a barrier release condition based on reaching a threshold on some measure. A measure can be number of processes/threads. A measure can be amount of data updated in a memory region. The synchronization barrier supports one or more measures.

Depending on the compute platform and the measure(s) being supported, synchronization barriers (e.g., "TBarriers") may be implemented in system applications, computing hardware, or a combination thereof. It should be noted that exposing the semantics of a compute thread to lower levels of a stack allows for efficient and optimized implementations. For example, when the measure is the number of processes/threads, a kernel layer or hypervisor layer may monitor/keep track of processes/threads hitting the barrier, signaling release of the barrier when the threshold is met, and ensuring that any remaining processes/threads are not blocked by the barrier. As another example, when the measure is the amount of data updated in a memory region, a hardware facility may be built into the memory system that tracks a number of blocks updated within a memory region (with limits on the size of the memory region and the granularity of the blocks) and generates a signal when a threshold is reached. The threshold and bounds of the memory region to be monitored by the hardware facility are programmable in this scenario.

Figure 4:
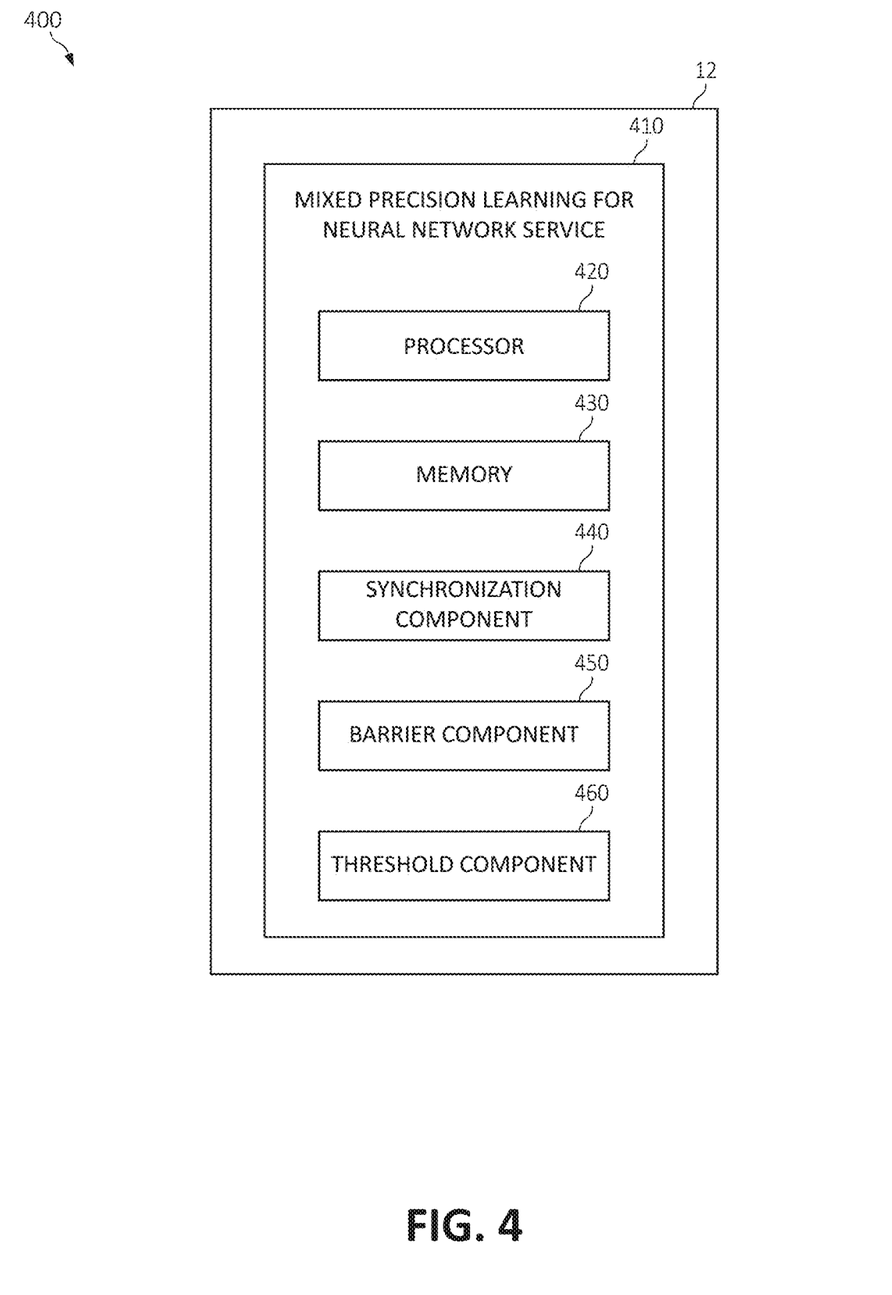
FIG. 4 is an additional block diagram depicting various user hardware and computing components functioning in accordance with aspects of the present invention.

Turning now to FIG. 4, a block diagram depicting exemplary functional components 400 according to various mechanisms of the illustrated embodiments is shown. In one aspect, one or more of the components, modules, services, applications, and/or functions described in FIGS. 1-3 may be used in FIG. 4. A synchronization service 410 is shown, incorporating processing unit ("processor") 420 to perform various computational, data processing and other functionality in accordance with various aspects of the present invention. The synchronization service 410 may be provided by the computer system/server 12 of FIG. 1. The processing unit 420 may be in communication with memory 430. The synchronization service 410 may include a synchronization component 440, a barrier component 450, and/or a threshold component 460, each of which may be in communication with each other.

As one of ordinary skill in the art will appreciate, the depiction of the various functional units in synchronization service 410 is for purposes of illustration, as the functional units may be located within the synchronization service 410 or elsewhere within and/or between distributed computing components.

In one embodiment, by way of example only, the synchronization service 410 may modularly construct a neural network for deep learning problem. More specifically, the synchronization service 410, using the barrier component 450, may synchronize one or more compute processes in one of a plurality of types of computing platforms using a barrier having a barrier release condition based on a threshold of one or more measures.

The barrier component 450 define the barrier according to one or more parameters. Additionally, the barrier component 450 may 1) define the barrier according to a type parameter and identify one or more various types of the measures according to the type parameter, 2) define the barrier according to a base parameter and define a range of the one or more measures supported by the barrier on one or more of the plurality of types of computing platforms according to the base parameter, and/or 3) define the barrier according to the threshold.

The threshold component 460 may define a threshold value used to determine the barrier release condition according to the threshold for the barrier component 450. The barrier component 450 may define the one or more measures as a number of the compute processes, an amount of data updated in a memory, or a combination thereof.

The barrier component, in association with the synchronization component 440, may release the one or more compute processes via the barrier upon exceeding the threshold of the one or more measures.

Thus, in view of FIG. 4, the present invention provides for implementing partial synchronization between compute processes based on threshold specification in a distributed or parallel computing environment. One or more compute processes may be synchronized in one of a plurality of types of computing platforms using a barrier (e.g., a synchronization barrier or "TBarrier") having a barrier release condition based on a threshold of one or more measures. The barrier is defined according to one or more parameters. The one or more compute processes may be released via the barrier upon exceeding the threshold of the one or more measures.

In one aspect, the barrier release condition is based on reaching a threshold on some measure. In one embodiment, the TBarrier can be specified using three parameters, as in the following notation: TBarrier ("type, base_set, threshold").

The "type" parameter identifies one or more types of measures supported for TBarriers on a computing platform. A measure may be an absolute number of processes, a fraction of processes, and/or an absolute/fractional amount of data updated in a memory region. The "type" parameter determines the format and interpretation of the values for the other 2 parameters.

The "base set" parameter defines a scope or range of the measure used to determine the barrier release condition. For example, the base set parameter may be an absolute or symbolic value for a total number of computing processes/threads involved in the TBarrier, computer program data structure, and/or bounds of a memory region to monitor for updates. It is also possible for the base set parameter value to be null (unused) such, as for example, when the TBarrier always waits for an absolute number of processes.

The "threshold" parameter defines an absolute or fractional threshold value that is used to determine the barrier release condition.

Figure 5:
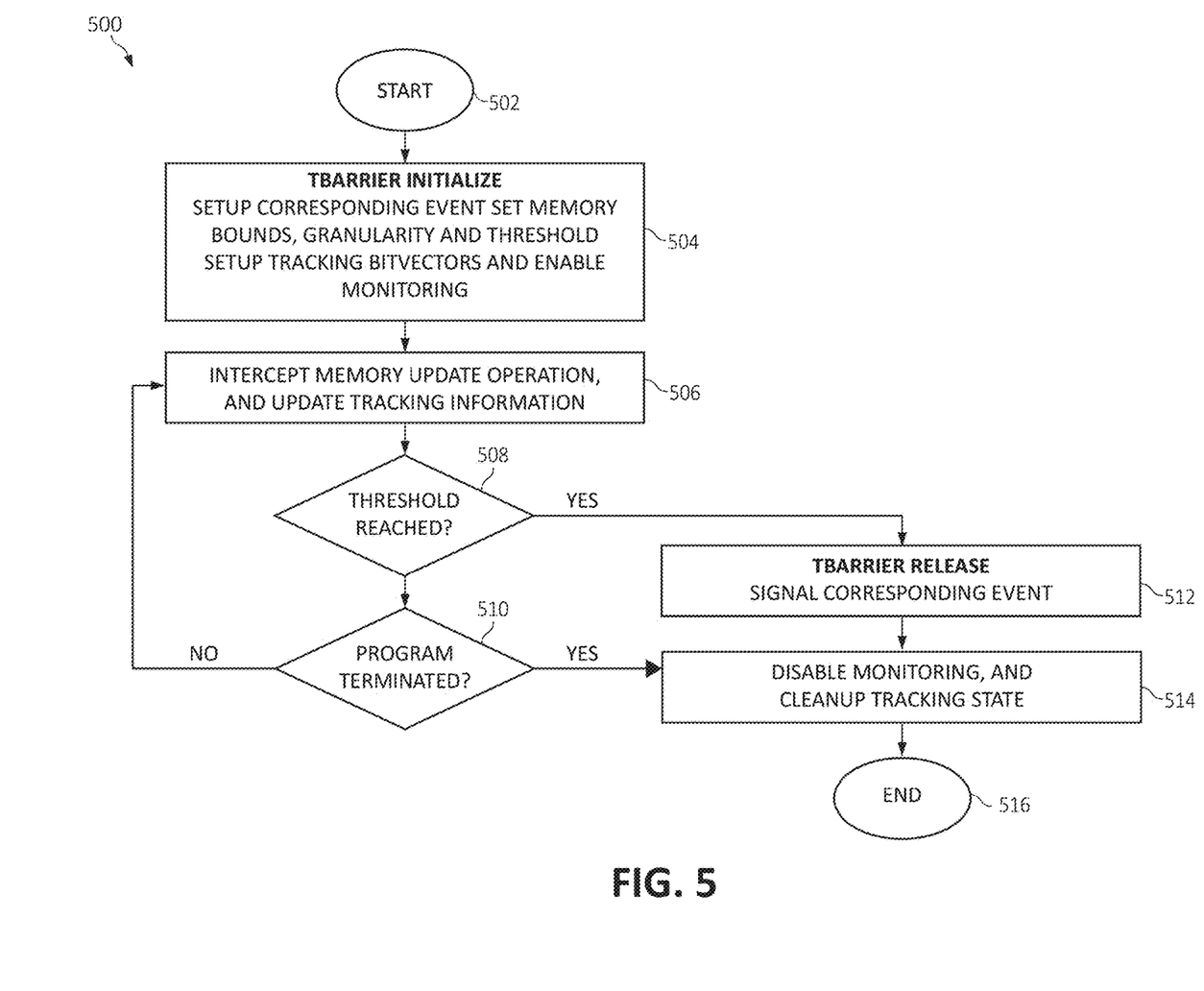
FIG. 5 is a flowchart diagram depicting an exemplary method for implementing partial synchronization between compute processes based on threshold specification by a processor in which aspects of the present invention may be realized.

FIG. 5 is a flowchart diagram depicting an exemplary method for implementing partial synchronization between compute processes based on threshold specification. In one aspect, one or more of the components, modules, services, applications, and/or functions described in FIGS. 1-4 may be used in FIG. 5. The functionality 500 may be implemented as a method executed as instructions on a machine, where the instructions are included on at least one computer readable medium or one non-transitory machine-readable storage medium. The functionality 500 may start, as in block 500.

A barrier (e.g., the Tbarrier) may be initialized, as in block 504. That is, the initialization of the barrier may include setting a corresponding event, setting the bounds of a memory, setting the granularity and threshold, and/or setting/initializing the tracking of bitvectors, and/or initializing/enabling monitoring.

When the measure for partial synchronization is an absolute or fractional amount of data updated in a memory region, the implementation may be required to maintain and keep track of the number and/or size of updated memory locations. For this purpose, an intercept memory update operation may be performed, and tracking information may be updated, as in block 506. A determination operation may be performed to determine if a threshold of one or more measures has been exceeded (e.g., "has the barrier threshold been reached?"), as in block 508. If yes, the barrier may perform a release operation (e.g., release one or more compute processes via the barrier upon exceeding the threshold of the one or more measures), as in block 512. When the implementation uses an event-handling framework for tracking information, the release operation, as in block 512, may signal an event corresponding to the release of the barrier. The method 500 may move to block 514.

If no at block 508, a determination operation may be performed to determine if the computing program has been terminated, as in block 510. If no, the method 500 may return to block 506. If yes at block 510, the method 500 may move to block 514. A disabling operation may be performed to disable the monitoring and a cleanup operation may be performed to clean up the tracking state, as in block 514. The functionality 500 may end in block 516.

Figure 6:
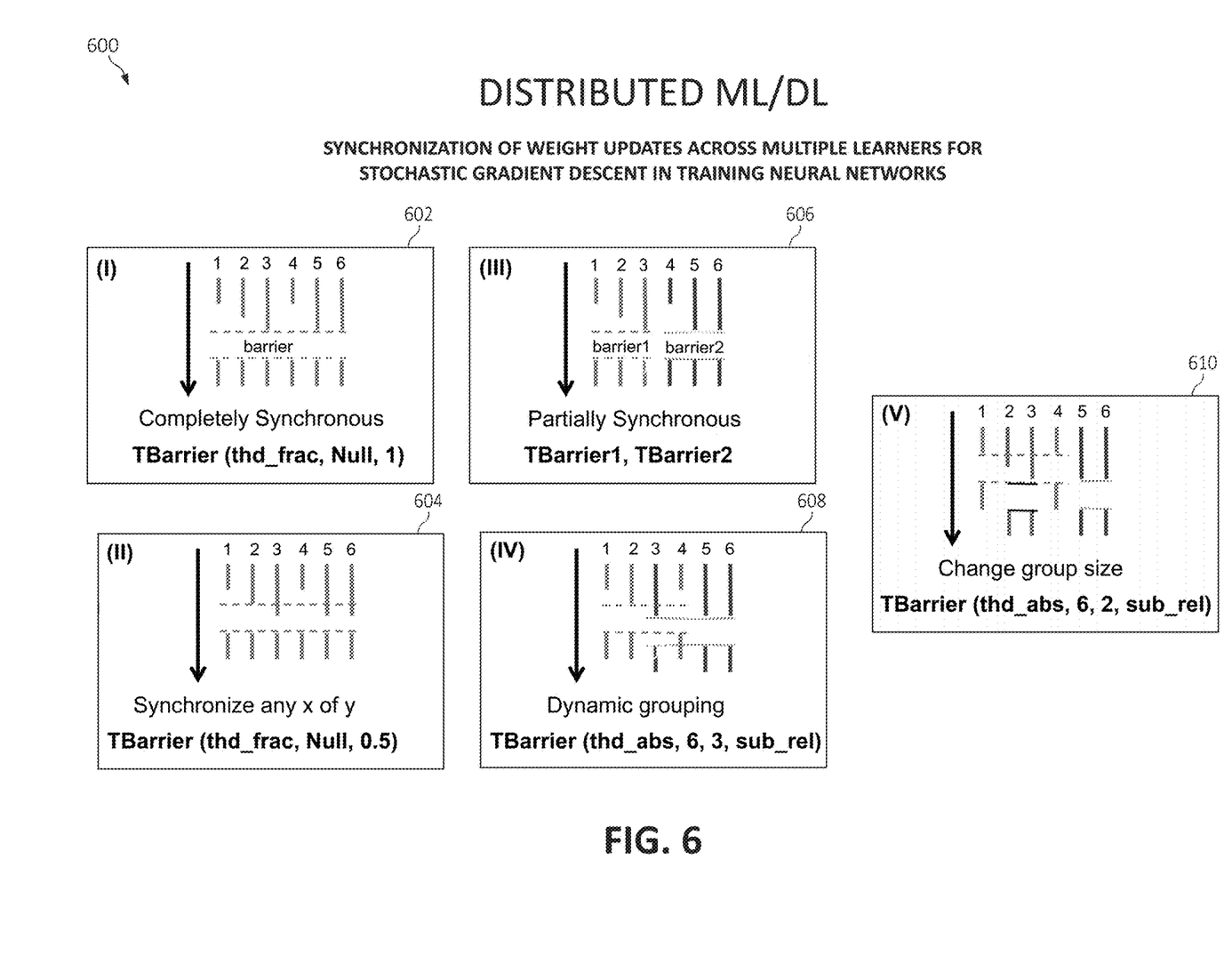
FIG. 6 is a diagram depicting an exemplary use case of partial synchronization between compute processes based on threshold specification in a distributed machine learning ("ML") or deep learning ("DL") computing environment in which aspects of the present invention may be realized.

Turning now to FIG. 6, diagram 600 depicts exemplary use cases 602, 604, 606, 608, and 610 of partial synchronization between compute processes based on threshold specification in a distributed machine learning ("ML") or deep learning ("DL") computing environment. In one aspect, one or more of the components, modules, services, applications, and/or functions described in FIGS. 1-5 may be used in FIG. 6.

That is, use case 602 illustrates using a TBarrier (e.g., thd_frac, null, 1) that provides complete synchronization, where "thd_frac" specifies the measure to be a fractional number of threads, "null" specifies a default value for a base set which includes all threads in the application, and "1" (or other value) is the fractional threshold value which implies synchronization across all the threads in the base set. Use case 604 illustrates using a TBarrier (e.g., thd_frac, null, 0.5) for synchronizing any "x" of "y" such as, for example, synchronizing algorithmic-level semantics in some application scenarios such as, for example, when "any x" number of processes from a set of "y" processes need to interlock, or when the barrier release should occur when a certain amount of data is updated in a specified memory region. In this case, the third parameter "0.5" is the fractional threshold value which implies partial synchronization across half of all the threads in the base set. Use case 606 illustrates using multiple TBarriers (e.g., Tbarrier 1 and Tbarrier 2) for partial synchronization. In this case, there is static grouping of compute processes whereby the set of processes that may participate in each TBarrier instance is determined prior to execution of the application code.

Use case 608 illustrates using a TBarrier (e.g., thd_abs, 6, 3, sub_rel) for dynamic grouping of computing processes. The "thd_abs" specifies the measure to be an absolute number of threads. "6" specifies the number of threads in the base set, "3" specifies the threshold value for the number of threads that must reach the barrier before it can be released, and "sub_rel" is an optional parameter that specifies that only the subset of threads that correspond to the threshold number of threads reaching the barrier are to be released. The effect of the TBarrier in this case is to dynamically group the base set of 6 threads into 2 groups of 3 threads each.

Use case 610 illustrates using a TBarrier (e.g., thd_abs, 6, 2, sub_rel) for dynamic grouping of computing processes with a changed group size. Use case 610 is analogous to use case 608 but with a changed group size. In use case 610, the effect of the TBarrier is to dynamically group the base set of 6 threads into 3 groups of 2 threads each.

Thus, as illustrated in FIG. 6, the TBarriers may be used for partially synchronous weight updating in a stochastic gradient descent used in training of deep neural networks. The fully synchronous operation of a stochastic gradient descent requires each computing process to wait for updates from all other computing processes. In using partial synchronization and weight updates: computing processes may be partitioned into subgroups, and each computing process only waits for updates from members of its subgroup. The use of TBarriers enables the ability to program different subgroup sizes (in terms of number of processes) and/or allows expressing and experimenting with different partial synchronization schemes (e.g., dynamically forming subgroups and waiting for updates from only a certain number of members of the subgroup).

Figure 7:
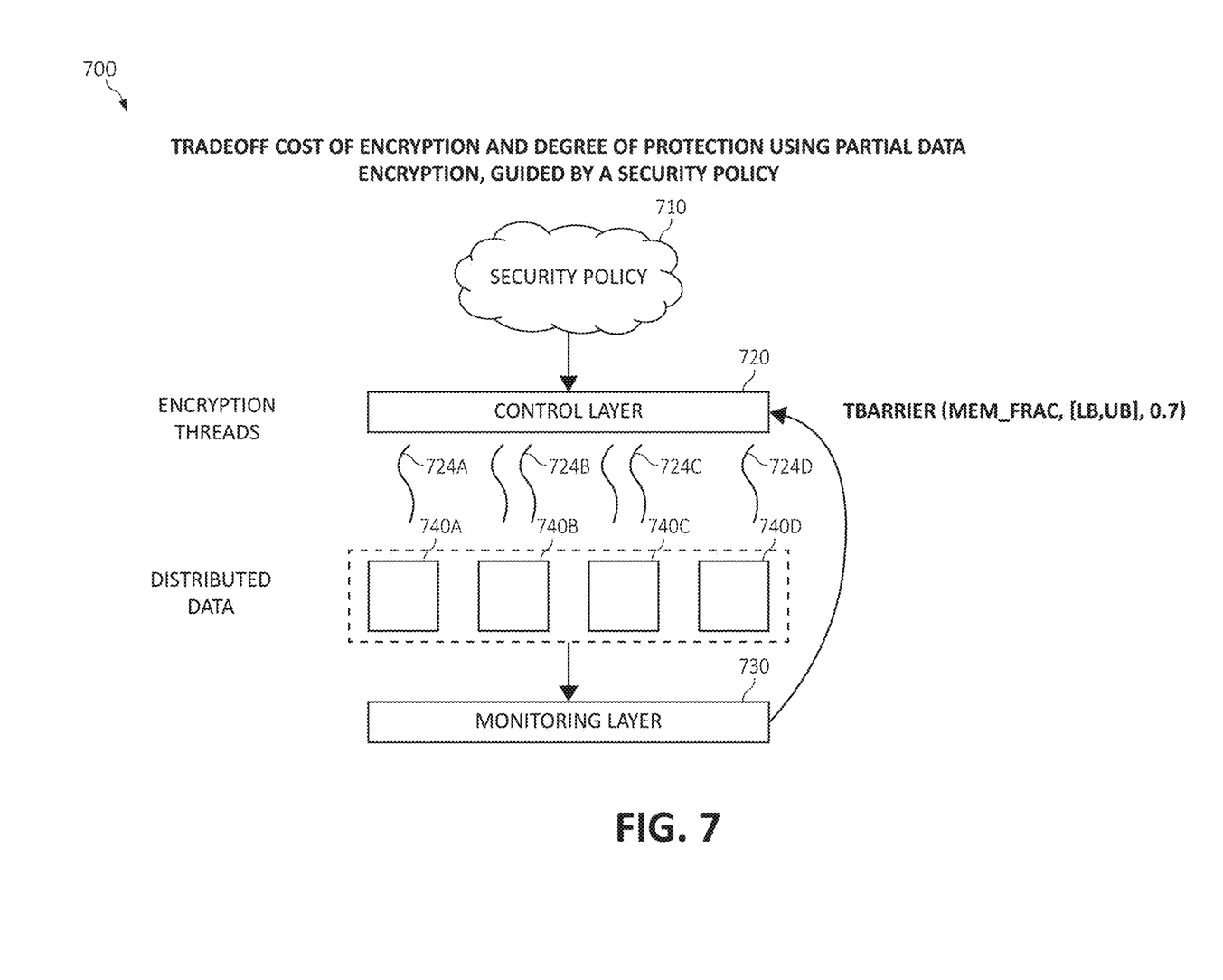
FIG. 7 is a diagram depicting an exemplary view illustrating trade off costs of encryption and a degree of protection using partial synchronization between compute processes based on threshold specification in which aspects of the present invention may be realized.

FIG. 7 is a diagram 700 depicting an exemplary view illustrating trade off costs of encryption and a degree of protection using partial synchronization between compute processes based on threshold specification in which aspects of the present invention may be realized. In one aspect, one or more of the components, modules, services, applications, and/or functions described in FIGS. 1-5 may be used in FIG. 7.

For example, multiple encryption threads 724A-D may be controlled by a control layer such as, for example, TBarrier 720 (e.g., MEM_FRAC, [LB,UB], 0.7). It should be noted that "MEM_FRAC" specifies the measure to be a fractional region of memory, "[LB,UB]" defines the memory region in the base set in terms of memory addresses for the lower bound of the memory region and the upper bound of the memory region, and "0.7" specifies the fractional threshold value of the memory region that must be updated before the barrier can be released (e.g., that is at least 70% of the memory region must be updated before release of the barrier). It should be noted that there may be a tradeoff between cost of encryption (in terms of time, and compute resources) of the encryption threads 724A-D and a degree of protection. A security policy 710 may dictate/indicate a desired level of protection and may be used to encode an expression for the threshold parameter of a TBarrier 720. The monitoring layer 730 may also monitor the threshold values of the TBarrier 720. That is, the monitoring layer 730 may monitor/keep track of processes/threads 724A-D hitting the TBarrier 720.

The threshold value, expressed as a fraction of the memory region to be encrypted, controls the amount of data such as, for example, distributed data 740A-D that is encrypted before the barrier 740 is released and encryption terminates.

Figure 8:
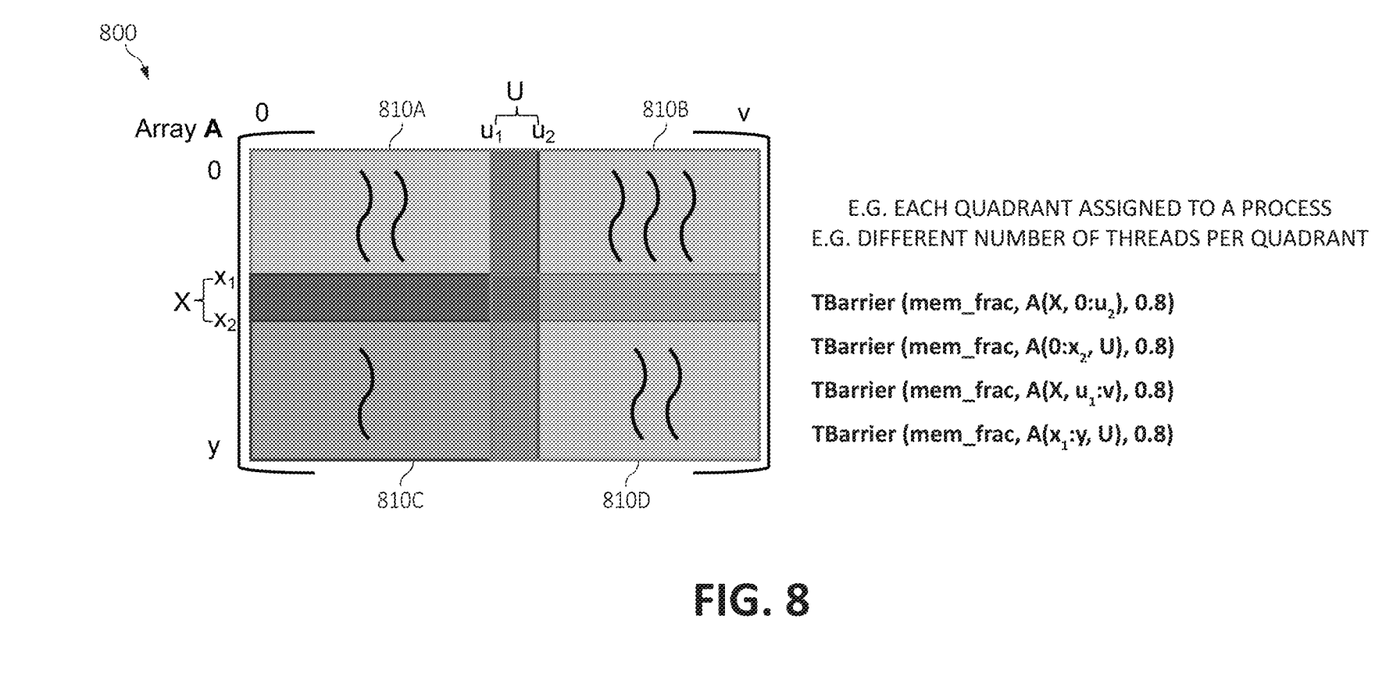
FIG. 8 is a diagram depicting an exemplary view using Jacobi iterative convergence using partial synchronization between compute processes based on threshold specification in which aspects of the present invention may be realized.

FIG. 8 is a diagram depicting an exemplary view of a matrix 800 using iterative convergence algorithm with partial synchronization between compute processes based on threshold specification in which aspects of the present invention may be realized. In one aspect, one or more of the components, modules, services, applications, and/or functions described in FIGS. 1-5 may be used in FIG. 8.

FIG. 8 illustrates an application using TBarriers in a parallel implementation of an iterative convergence algorithm such as, for example, a Jacobi iterative convergence operation. In each iteration of the Jacobi iterative convergence operation, every element of a matrix 800 is updated based on values of elements in neighboring rows and/or columns. In matrix 800, each quadrant such as, for example, quadrants 810A-810D, may be assigned to a process (e.g., a different number of computing processes/threads per quadrant). The Jacobi iterative convergence operation works correctly even without synchronization between iterations such that computation in a successive iteration may use updated values from the previous iteration, or stale values from earlier in the program execution, or some combination of updated and stale values. The ratio of updated to stale values represents a tradeoff between speed of computation per iteration and a number of iterations required for convergence.

TBarriers such as, for example, TBarrier (mem_frac, A(X, 0:u2), 0.8), TBarrier (mem_frac, A(0:x2, U), 0.8), TBarrier (mem_frac, A(X, u1:v), 0.8), TBarrier (mem_frac, A(x1:y, U), 0.8) may be used to control a minimum ratio of updated to stale values used in the successive iteration by appropriately setting threshold values for updated array regions. This allows tuning the overall application performance by simply changing the value of the threshold parameter of the TBarrier. Further, different compute platforms support different computation resources and communication latencies/bandwidths. As a result, different compute platforms may exhibit the best execution performance (in terms of least amount of time needed or maximum energy efficiency for the application to finish execution) when using different ratios of updated and stale values. In this case, the use of TBarriers provides for increasing computing efficiency and adjusting performance across disparate computing platforms.

Figure 9:
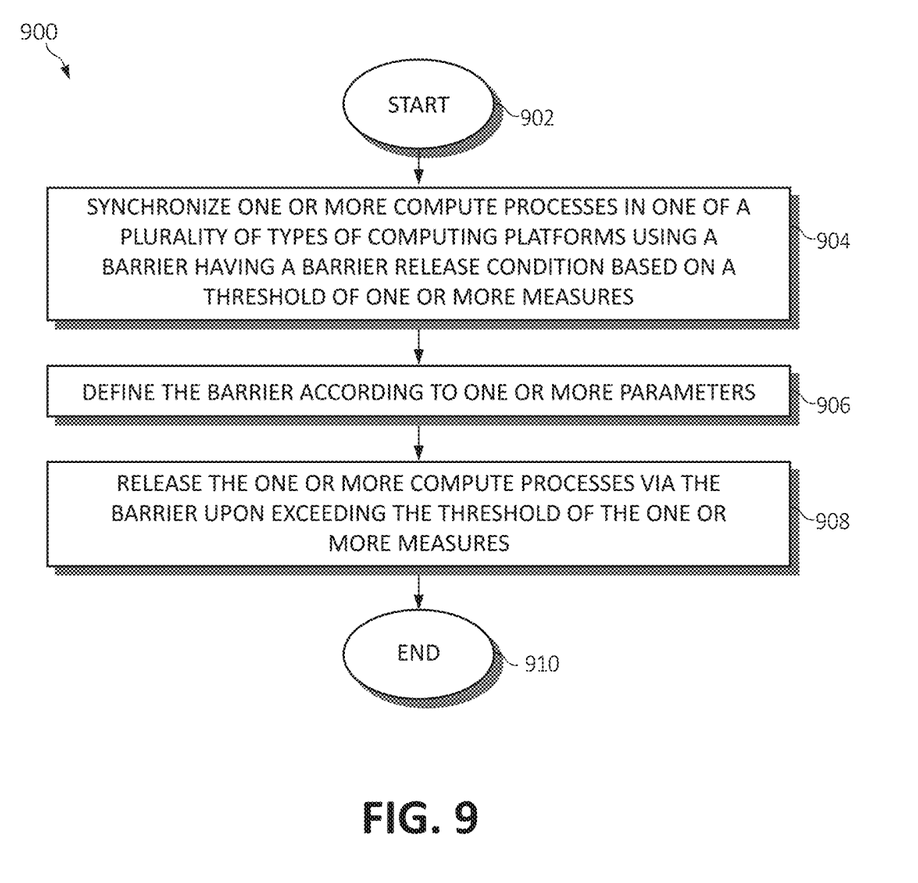
FIG. 9 is a flowchart diagram depicting an exemplary method for implementing partial synchronization between compute processes based on threshold specification by a processor in which aspects of the present invention may be realized.

Turning now to FIG. 9, an additional method 900 for implementing partial synchronization between compute processes based on threshold specification in a computing environment is depicted, in which various aspects of the illustrated embodiments may be implemented. The functionality 900 may be implemented as a method executed as instructions on a machine, where the instructions are included on at least one computer readable medium or one non-transitory machine-readable storage medium. The functionality 900 may start, as in block 902.

One or more compute processes may be synchronized in one of a plurality of types of computing platforms using a barrier having a barrier release condition based on a threshold of one or more measures, as in block 904. The barrier is defined according to one or more parameters, as in block 906. The one or more compute processes may be released via the barrier upon exceeding the threshold of the one or more measures, as in block 908. The functionality 900 may end in block 910.

In one aspect, in conjunction with and/or as part of at least one block of FIG. 9, the operations of method 900 may include each of the following. The operations of method 900 may define the barrier according to one or more parameters and/or define the barrier according to a type parameter and identify one or more various types of the measures according to the type parameter.

The operations of method 900 may define the barrier according to a base parameter and define a range of the one or more measures supported by the barrier on one or more of the plurality of types of computing platforms according to the base parameter. The operations of method 900 may define the barrier according to the threshold and define a threshold value used to determine the barrier release condition according to the threshold. In an additional aspect, the operations of method 900 may define the one or more measures as a number of the compute processes, an amount of data updated in a memory, or a combination thereof. The operations of method 900 may release the one or more compute processes via the barrier upon exceeding the threshold of the one or more measures.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for implementing synchronization between compute processes based on threshold specification by a processor, comprising:
   receiving application code having a set of compute processes, wherein the application code implements a machine learning operation requiring synchronous operation of the set of compute processes;
   during execution of the application code, dynamically grouping a plurality of the set of compute processes into a subgroup; and
   synchronizing one or more compute processes within the subgroup of the plurality of compute processes in one of a plurality of types of computing platforms using a barrier having a barrier release condition based on a threshold of one or more measures, wherein the one or more measures include both an algorithmic-level semantic representation of any first number of processes of a second number of the subgroup of the processes reaching the barrier and a fractional amount of data relating to the machine learning operation being updated in a specified memory region.

2. The method of claim 1, further including defining the barrier according to one or more parameters.

3. The method of claim 1, further including:
   defining the barrier according to a type parameter; and
   identifying one or more various types of the measures according to the type parameter.

4. The method of claim 1, further including:
   defining the barrier according to a base parameter; and
   defining a range of the one or more measures supported by the barrier on one or more of the plurality of types of computing platforms according to the base parameter.

5. The method of claim 1, further including:
   defining the barrier according to the threshold; and
   defining a threshold value used to determine the barrier release condition according to the threshold.

6. The method of claim 1, further including releasing the one or more compute processes via the barrier upon exceeding the threshold of the one or more measures.

7. A system for implementing synchronization between compute processes based on threshold specification in a computing environment, comprising:
   one or more computers with executable instructions that when executed cause the system to:
      receive application code having a set of compute processes, wherein the application code implements a machine learning operation requiring synchronous operation of the set of compute processes;
      during execution of the application code, dynamically group a plurality of the set of compute processes into a subgroup; and
      synchronize one or more compute processes within the subgroup of the plurality of compute processes in one of a plurality of types of computing platforms using a barrier having a barrier release condition based on a threshold of one or more measures, wherein the one or more measures include both an algorithmic-level semantic representation of any first number of processes of a second number of the subgroup of the processes reaching the barrier and a fractional amount of data relating to the machine learning operation being updated in a specified memory region.

8. The system of claim 7, wherein the executable instructions define the barrier according to one or more parameters.

9. The system of claim 7, wherein the executable instructions:
   define the barrier according to a type parameter; and
   identify one or more various types of the measures according to the type parameter.

10. The system of claim 7, wherein the executable instructions:
    define the barrier according to a base parameter; and
    define a range of the one or more measures supported by the barrier on one or more of the plurality of types of computing platforms according to the base parameter.

11. The system of claim 7, wherein the executable instructions:
    define the barrier according to the threshold; and
    define a threshold value used to determine the barrier release condition according to the threshold.

12. The system of claim 7, wherein the executable instructions release the one or more compute processes via the barrier upon exceeding the threshold of the one or more measures.

13. A computer program product for implementing synchronization between compute processes based on threshold specification in a computing environment by a processor, the computer program product comprising a non-transitory computer-readable storage medium having computer-readable program code portions stored therein, the computer-readable program code portions comprising:
    an executable portion that receives application code having a set of compute processes, wherein the application code implements a machine learning operation requiring synchronous operation of the set of compute processes;
    an executable portion that, during execution of the application code, dynamically groups a plurality of the set of compute processes into a subgroup; and
    an executable portion that synchronizes one or more compute processes within the subgroup of the plurality of compute processes in one of a plurality of types of computing platforms using a barrier having a barrier release condition based on a threshold of one or more measures, wherein the one or more measures include both an algorithmic-level semantic representation of any first number of processes of a second number of the subgroup of the processes reaching the barrier and a fractional amount of data relating to the machine learning operation being updated in a specified memory region.

14. The computer program product of claim 13, further including an executable portion that defines the barrier according to one or more parameters.

15. The computer program product of claim 13, further including an executable portion that:
    defines the barrier according to a type parameter;
    identifies one or more various types of the measures according to the type parameter;
    defines the barrier according to a base parameter; or
    defines a range of the one or more measures supported by the barrier on one or more of the plurality of types of computing platforms according to the base parameter.

16. The computer program product of claim 13, further including an executable portion that:
    defines the barrier according to the threshold; and
    defines a threshold value used to determine the barrier release condition according to the threshold.

17. The computer program product of claim 13, further including an executable portion that releases the one or more compute processes via the barrier upon exceeding the threshold of the one or more measures.

* * * * *